(12) United States Patent
Chisick et al.

(10) Patent No.: US 7,670,576 B2
(45) Date of Patent: Mar. 2, 2010

(54) METHODS OF TREATMENT OF CHROMITE ORE PROCESSING RESIDUE

(75) Inventors: Steven A. Chisick, Highland, IN (US); Timothy Clark Heffernan, Indianapolis, IN (US); Thomas P. McCullough, Indianapolis, IN (US); Gary Joel Meyer, Indianapolis, IN (US)

(73) Assignee: Redox Solutions, LLC, Indianapolis, IN (US)

( * ) Notice: Subject to any disclaimer, the term of this patent is extended or adjusted under 35 U.S.C. 154(b) by 230 days.

(21) Appl. No.: 11/578,621

(22) PCT Filed: Sep. 7, 2005

(86) PCT No.: PCT/US2005/031984

§ 371 (c)(1),
(2), (4) Date: Oct. 16, 2006

(87) PCT Pub. No.: WO2006/031590

PCT Pub. Date: Mar. 23, 2006

(65) Prior Publication Data

US 2007/0224097 A1 Sep. 27, 2007

Related U.S. Application Data

(60) Provisional application No. 60/609,095, filed on Sep. 10, 2004, provisional application No. 60/634,457, filed on Dec. 9, 2004, provisional application No. 60/700,778, filed on Jul. 20, 2005.

(51) Int. Cl.
*C02F 1/52* (2006.01)
(52) U.S. Cl. .................. 423/55; 210/710; 210/720; 210/913; 588/319; 588/412
(58) Field of Classification Search .................. 423/55; 210/710, 720, 913; 588/319, 412
See application file for complete search history.

(56) References Cited

U.S. PATENT DOCUMENTS

| 3,740,331 | A | * | 6/1973 | Anderson et al. | ........... 210/726 |
| 3,981,965 | A | | 9/1976 | Gancy et al. | |
| 4,086,150 | A | | 4/1978 | Kindl et al. | |
| 4,102,784 | A | * | 7/1978 | Schlauch | ................... 210/716 |
| 4,684,472 | A | | 8/1987 | Abbe et al. | |
| 4,705,639 | A | | 11/1987 | Aldrich | |
| 5,000,859 | A | | 3/1991 | Suciu et al. | |
| 5,397,478 | A | | 3/1995 | Pal et al. | |
| 2006/0094921 | A1 | * | 5/2006 | Roper, Jr. | .................. 588/257 |

FOREIGN PATENT DOCUMENTS

JP 11-207314 * 8/1999

OTHER PUBLICATIONS

Translation of Japan 11-207314, Aug. 1999.*
Tinjum et al., "Treatment of Cr(VI) in COPR Using Ferrous Sulfate-Sulfuric Acid or Cationic Polysulfides" Journal of Geotechnical and Geoenvironmental Engineering, Dec. 2008, pp. 1791-1803.*
"Remediation of Chromium Ore Processing Residue (COPR) and Mitigation of the Impacts on Transportation Facilities", James Martin Tinjum, Dept. of Civil and Environmental Engineering, Univ. of Wis-Madison, Apr. 30, 2004.
PCT International Search Report for PCT/US2005/031984 completed by the United States Searching Authority in Jan. 2006.
Margaret C. Graham et al., "Calcium polysulfide remediation of hexavalent chromium contamination from chromite ore processing residue", Science of the Total Environment, vol. 364, pp. 32-44, 2006.

* cited by examiner

*Primary Examiner*—Steven Bos
(74) *Attorney, Agent, or Firm*—Barnes & Thornburg LLP

(57) ABSTRACT

Methods to reduce hexavalent chromium (Cr(VI)) in chromite processing wastes include one or more of the following steps: contacting the chromite processing wastes with an oxygen scavenger or chemical reducer; permitting the chromite processing wastes to react with the oxygen scavenger or chemical reducer; contacting the chromite processing wastes with ferrous ion; contacting the chromite processing wastes with sulfide ion; and, contacting the chromite processing wastes with ferrous sulfide.

9 Claims, 2 Drawing Sheets

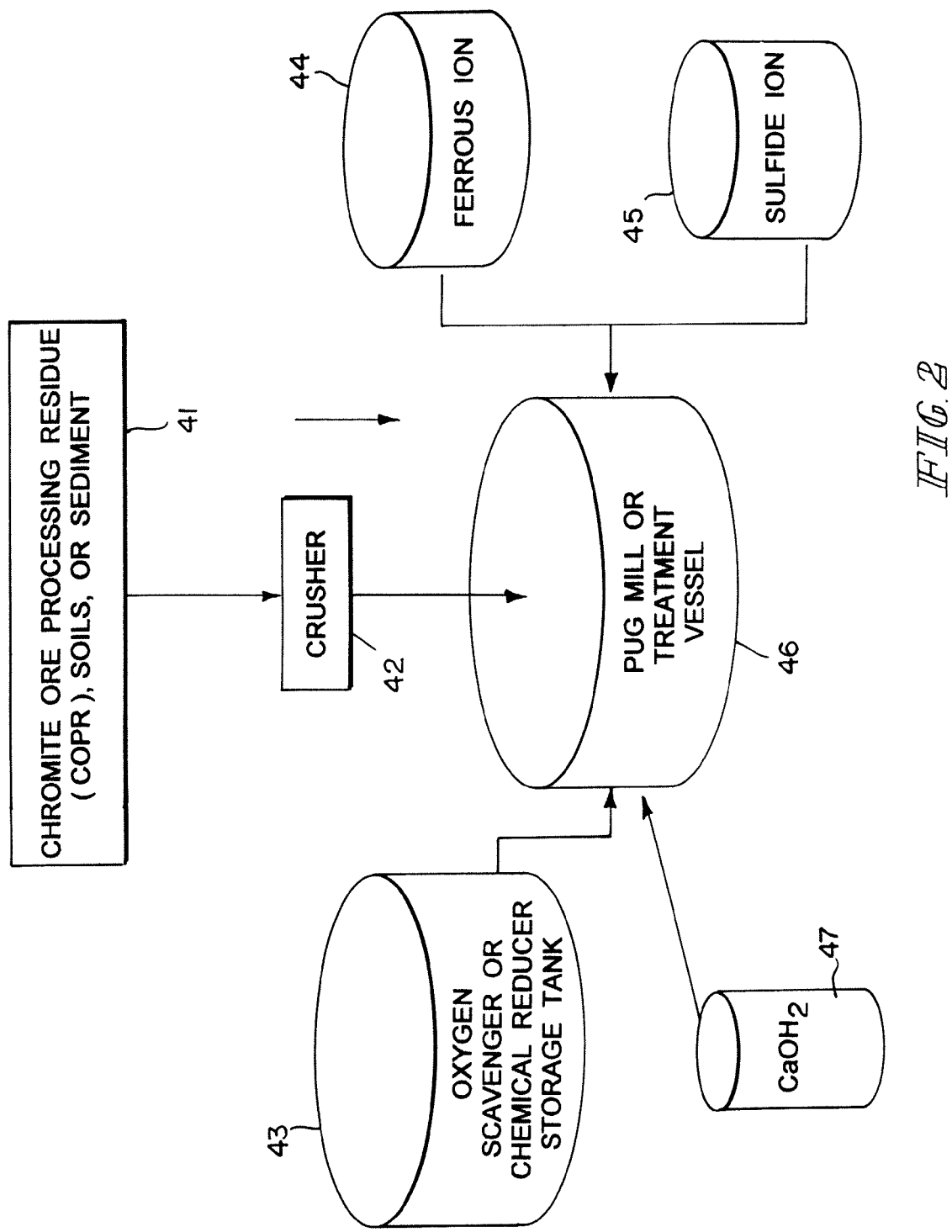

METHODS OF TREATMENT OF CHROMITE ORE PROCESSING RESIDUE

CROSS REFERENCE TO RELATED APPLICATIONS

This is the U.S. national phase of PCT/US2005/31984. PCT/US2005/31984 claims the benefit of the filing dates of U.S. Ser. No. 60/609,095, filed Sep. 10, 2004, U.S. Ser. No. 60/634,457, filed Dec. 9, 2004, and U.S. Ser. No. 60/700,778, filed Jul. 20, 2005. The disclosures of these applications are hereby incorporated herein by reference.

FIELD OF THE INVENTION

This invention relates to environmental remediation. It is disclosed in the context of remediation of chromate ore processing residue (hereinafter sometimes COPR)-containing soils and the like. However, it is believed to have other applications as well.

BACKGROUND OF THE INVENTION

Millions of tons of COPR were historically generated in conjunction with the extraction of chromium from chromium-bearing ores. Containing high concentrations of chromium in trivalent and hexavalent valence states, COPR deposits leach chromium into the environment over very long time frames. The mechanisms controlling this leaching are complex and not well understood. With an intricate mineralogy, highly alkaline pH, and an aggressive ion exchange capacity, COPR represents a very challenging treatment problem. Thus, the cost-effective treatment of COPR waste has proven difficult.

The leaching of soluble chromium from most chromium-bearing wastes can be controlled through the application of any number of chemical reducing agents. These treatment reagents reduce hexavalent chromium, which is soluble and exhibits a high toxicity, to the less toxic and less soluble trivalent state.

However, these approaches have not proven effective for high concentration COPR deposits. While COPR has been successfully treated at Resource Conservation and Recovery Act (hereinafter sometimes RCRA)-permitted facilities for many years, most of this treated material has consisted of COPR contaminated soils with total chromium concentrations from 200 to 4,000 mg/kg. In these relatively low concentration materials, 1% to 8% of the total chromium is typically present as hexavalent chromium (hereinafter sometimes Cr(VI)). At these relatively low total chromium concentrations, conventional chromium treatment technologies can reduce the toxic characteristic leaching procedures (hereinafter sometimes TCLP) chromium to below the Universal Treatment Standard (hereinafter sometimes UTS) of 0.60 mg/kg, and remain stable.

For sites highly enriched with COPR, the total chromium concentration can exceed 27,000 mg/kg, with 30% to 60% existing as Cr(VI). Research shows that conventional treatment reagents can often achieve the UTS for chromium when applied to these concentrated COPR wastes, but within weeks chromium begins to remobilize and resume leaching at high concentrations.

One study performed by RMT, Inc., 744 Heartland Trail (53717-1934), P.O. Box 8923 (53708-8923), Madison, Wis., illustrates this pattern. An alkaline COPR waste was treated with 10% by weight of ferrous sulfate heptahydrate and 5% by weight ferric sulfate. The treated material was then screened for TCLP chromium over a period of four weeks with the following results:

| Time Elapsed After Treatment | TCLP Cr Concentration (mg/l) |
|---|---|
| 0 days | 0.8 |
| 3 days | 2.6 |
| 7 days | 7.0 |
| 28 days | 14.2 |

The issue of remobilization/re-oxidation of the chromium is rarely (if ever) confirmed at RCRA-permitted facilities. By permit, these facility operators treat the COPR, test it post-treatment, and then landfill the material at a RCRA Subtitle D or RCRA Subtitle C cell unaware that the treated COPR will soon be contributing hexavalent chromium to their landfill leachate. It is postulated that any treatment of COPR with total chromium concentrations exceeding 10,000 mg/kg needs to be tested weeks after treatment to confirm the long-term stability of any treatment technology employed. Failure to conduct such testing could result in the creation of unwanted long-term liabilities.

Enriched COPR wastes display a slow dissolving mineral-based alkalinity that is difficult to overcome without the addition of significant quantities of strong acids. Treatment approaches that can permanently reduce the pH of concentrated COPR wastes may avoid this Cr remobilization pitfall. Although these methodologies achieve the desired TCLP limits, they generally have not been shown to be cost-effective. Also, the costs and dangers associated with working with large quantities of strong acids makes these approaches virtually impractical to implement on a large scale.

Other effective treatment regimens for COPR waste are based upon the usage of various reagents. Although effective, the high reagent concentrations required for successful treatment cause large-scale implementation to be cost-prohibitive. Also, for large COPR clean-up projects, the demand for traditional reagents most likely will exceed the available supply of the required reagents. The ability of COPR waste to "consume" large reagent volumes appears to derive from the aggressive ion exchange capacity of COPR. Research on COPR waste conducted by Geelhoed, et al. demonstrated that hydrocalumite, one of the chromium-bearing mineral phases present in COPR, readily undergoes anion exchange. Their research showed that treatment with ferrous sulfate, a commonly used reagent for columbium reduction, actually results in increased leaching of chromium from COPR. This occurred when the sulfate anion exchanges for the chromate anion in the hydrocalumite.

Gancy et al U.S. Pat. No. 3,981,965 (hereinafter sometimes Gancy) teaches that one group of compounds that perform quite satisfactorily in an alkaline medium to reduce soluble chromium compounds to the insoluble form, are those organic compounds which have labile sulfide atoms and therefore behave as slow-release sulfide reagents. Among this group of organic compounds are thiourea, thioglycolic acid, sodium xanthate, thioacetamide, and bis(dimethylthiocarbamoyl)disulfide.

Gancy further teaches that of the two preferred sulfides, namely sodium hydrosulfide and calcium sulfide, each appears to behave in a unique manner. The sodium hydrosulfide is quite soluble and could be expected to form polysulfides as does the more alkaline sodium sulfide. Gancy explains that the yellow color of the polysulfide generally in evidence when sodium hydrosulfide is first used as a reductant, but this color is transient, and soon disappears. The objection to the yellow color of the polysulfides, according to Gancy, stems from its resemblance to the toxic yellow chromate bleed, and although almost indistinguishable in appearance, the polysulfide is substantially non-toxic in comparison with the soluble chromium bleed which it resembles. Gancy thus teaches away from the use of polysulfide in COPR remediation and, in those cases where polysulfide may be formed, recommends suppression of polysulfide formation by the addition of a minor amount of sodium sulfite to the chromite ore processing residue.

A more in-depth analysis of the environmental hazards posed by COPR and various remediation methods are found in the thesis of James Martin Tinjum, "Remediation of Chromium Ore Processing Residue (COPR) and Mitigation of the Impacts on Transportation Facilities," Apr. 30, 2004, submitted in partial fulfillment of the requirements for a Ph. D. degree in the Department of Civil and Environmental Engineering, University of Wisconsin, Madison, Wis.

The disclosures of all of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to an aspect of the invention, a method to reduce hexavalent chromium (Cr(VI)) in chromite ore processing residue (COPR), soils or sediments includes contacting the COPR with an oxygen scavenger or chemical reducer, permitting the COPR to react with the oxygen scavenger or chemical reducer and then contacting the COPR with ferrous sulfide to reduce Cr(VI) in the COPR.

Further illustratively according to this aspect of the invention, the method includes crushing or grinding the COPR, soils or sediment before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

Illustratively according to this aspect of the invention, contacting the COPR with ferrous sulfide comprises adding the ferrous sulfide to the treatment vessel containing the COPR, soils or sediments and mixing the ferrous sulfide with the COPR, soils or sediments.

Further illustratively according to this aspect of the invention, the method comprising producing the ferrous sulfide by combining at least one of ferrous sulfate heptahydrate and ferrous chloride with at least one of sodium hydrosulfide and calcium polysulfide.

Further illustratively according to this aspect of the invention, the method includes determining the pH of toxic characteristic leaching procedures (TCLP) extraction fluid from the thus-treated COPR, and, if the pH is below 7, adding a base to the thus-treated COPR to increase the pH of TCLP extraction fluid from the thus-treated COPR to above 7.

Illustratively according to this aspect of the invention, adding a base comprises adding calcium hydroxide to the treatment vessel.

According to another aspect of the invention, a method to reduce Cr(VI) in COPR, soils or sediments includes contacting the COPR with an oxygen scavenger or chemical reducer, permitting the COPR to react with the oxygen scavenger or chemical reducer and then contacting the COPR with sulfide ion and ferrous ion to reduce Cr(VI) in the COPR.

Illustratively according to this aspect of the invention, the method includes crushing or grinding the COPR, soils or sediment before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

Further illustratively according to this aspect of the invention, the method comprises combining at least one of ferrous sulfate heptahydrate and ferrous chloride with at least one of sodium hydrosulfide and calcium polysulfide to provide the ferrous ion and sulfide ion.

Illustratively according to this aspect of the invention, contacting the COPR with sulfide ion and ferrous ion comprises adding ferrous sulfide to the treatment vessel containing the COPR, soils or sediments and mixing the ferrous sulfide with the COPR, soils or sediments.

Further illustratively according to this aspect of the invention, the method includes determining the pH of TCLP extraction fluid from the thus-treated COPR, and, if the pH is below 7, adding a base to the thus-treated COPR to increase the pH of TCLP extraction fluid from the thus-treated COPR to above 7.

Illustratively according to this aspect of the invention, adding a base comprises adding calcium hydroxide to the treatment vessel.

According to another aspect of the invention, a method to reduce Cr(VI) in COPR, soils or sediments includes contacting the COPR with ferrous sulfide produced by combining at least one of ferrous sulfate heptahydrate and ferrous chloride with at least one of sodium hydrosulfide and calcium polysulfide to reduce Cr(VI) in the COPR.

Further illustratively according to this aspect of the invention, the method includes contacting the COPR with an oxygen scavenger or chemical reducer, permitting the COPR to react with the oxygen scavenger or chemical reducer and then contacting the COPR with ferrous sulfide to reduce Cr(VI) in the COPR.

Further illustratively according to this aspect of the invention, the method includes crushing or grinding the COPR, soils or sediments before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

According to another aspect of the invention, a method to reduce Cr(VI) in COPR, soils or sediments includes contacting the COPR with an oxygen scavenger or chemical reducer and sulfide ion to reduce Cr(VI) in the COPR.

Further illustratively according to this aspect of the invention, the method includes crushing or grinding the COPR, soils or sediments before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

Illustratively according to this aspect of the invention, contacting the COPR with sulfide ion comprises adding the sulfide ion to the treatment vessel containing the COPR, soils or sediments and mixing the sulfide ion with the COPR, soils or sediments.

Illustratively according to this aspect of the invention, contacting the COPR with sulfide ion comprises producing ferrous sulfide and contacting the COPR with the ferrous sulfide.

Illustratively according to this aspect of the invention, producing ferrous sulfide comprises combining at least one of ferrous sulfate heptahydrate and ferrous chloride with at least one of sodium hydrosulfide and calcium polysulfide.

Further illustratively according to this aspect of the invention, the method includes determining the pH of TCLP extraction fluid from the thus-treated COPR, and, if the pH is below 7, adding a base to the thus-treated COPR to increase the pH of TCLP extraction fluid from the thus-treated COPR to above 7.

Illustratively according to this aspect of the invention, adding a base comprises adding calcium hydroxide to the treatment vessel.

According to another aspect of the invention, a method to reduce Cr(VI) in COPR, soils or sediments including contacting the COPR with an oxygen scavenger or chemical reducer and ferrous ion to reduce Cr(VI) in the COPR.

Further illustratively according to this aspect of the invention, the method includes crushing or grinding the COPR, soils or sediment before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

Illustratively according to this aspect of the invention, contacting the COPR with ferrous ion comprises adding the ferrous ion to the treatment vessel containing the COPR, soils or sediments and mixing the ferrous ion with the COPR, soils or sediments.

Illustratively according to this aspect of the invention, contacting the COPR with ferrous ion comprises producing ferrous sulfide and contacting the COPR with the ferrous sulfide.

Illustratively according to this aspect of the invention, producing ferrous sulfide comprises combining at least one of ferrous sulfate heptahydrate and ferrous chloride with at least one of sodium hydrosulfide and calcium polysulfide.

Further illustratively according to this aspect of the invention, the method includes determining the pH of TCLP extraction fluid from the thus-treated COPR, and, if the pH is below 7, adding a base to the thus-treated COPR to increase the pH of TCLP extraction fluid from the thus-treated COPR to above 7.

Illustratively according to this aspect of the invention, adding a base comprises adding calcium hydroxide to the treatment vessel.

According to another aspect of the invention, a method to reduce Cr(VI) in COPR, soils or sediments includes contacting the COPR with sulfide ion and ferrous ion to reduce Cr(VI) in the COPR.

Illustratively according to this aspect of the invention, contacting the COPR with sulfide ion and ferrous ion comprises contacting the COPR with ferrous sulfide.

Illustratively according to this aspect of the invention, contacting the COPR with ferrous sulfide comprises combining at least one of ferrous sulfate heptahydrate and ferrous chloride with at least one of sodium hydrosulfide and calcium polysulfide.

Further illustratively according to this aspect of the invention, the method includes contacting the COPR with an oxygen scavenger or chemical reducer, permitting the COPR to react with the oxygen scavenger or chemical reducer and then contacting the COPR with sulfide ion and ferrous ion to reduce Cr(VI) in the COPR.

Further illustratively according to this aspect of the invention, the method includes crushing or grinding the COPR, soils or sediments before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

Further illustratively according to this aspect of the invention, the method includes determining the pH of TCLP extraction fluid from the thus-treated COPR, and, if the pH is below 7, adding a base to the thus-treated COPR to increase the pH of TCLP extraction fluid from the thus-treated COPR to above 7.

Illustratively according to this aspect of the invention, adding a base comprises adding calcium hydroxide to the treatment vessel.

According to another aspect of the invention, a method to reduce Cr(VI) in COPR, soils or sediments includes contacting the COPR with sulfide ion to reduce Cr(VI) in the COPR.

Illustratively according to this aspect of the invention, contacting the COPR with sulfide ion comprises contacting the COPR with ferrous sulfide.

Further illustratively according to this aspect of the invention, the method includes producing ferrous sulfide by combining at least one of ferrous sulfate heptahydrate and ferrous chloride with at least one of sodium hydrosulfide and calcium polysulfide.

Further illustratively according to this aspect of the invention, the method includes contacting the COPR with an oxygen scavenger or chemical reducer, permitting the COPR to react with the oxygen scavenger or chemical reducer and then contacting the COPR with sulfide ion to reduce Cr(VI) in the COPR.

Further illustratively according to this aspect of the invention, the method includes crushing or grinding the COPR, soils or sediment before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

According to another aspect of the invention, a method to reduce Cr(VI) in COPR, soils or sediments including contacting the COPR with a polysulfide to reduce Cr(VI) in the COPR.

Illustratively according to this aspect of the invention, contacting the COPR with a polysulfide comprises contacting the COPR with calcium polysulfide.

Further illustratively according to this aspect of the invention, the method includes contacting the COPR with an oxygen scavenger or chemical reducer, permitting the COPR to react with the oxygen scavenger or chemical reducer and then contacting the COPR with polysulfide to reduce Cr(VI) in the COPR.

Further illustratively according to this aspect of the invention, the method includes crushing or grinding the COPR, soils or sediment before contacting the COPR with an oxygen scavenger or chemical reducer.

Illustratively according to this aspect of the invention, contacting the COPR with an oxygen scavenger or chemical reducer includes contacting the COPR with one of sodium sulfite and sodium bi-sulfite.

Illustratively according to this aspect of the invention, contacting the COPR with an oxygen scavenger or chemical reducer includes adding the oxygen scavenger or chemical reducer to a treatment vessel containing the COPR, soils or sediments and mixing the oxygen scavenger or chemical reducer with the COPR, soils or sediments in the treatment vessel.

Further illustratively according to this aspect of the invention, the method includes determining the pH of TCLP extraction fluid from the thus-treated COPR, and, if the pH is below 7, adding a base to the thus-treated COPR to increase the pH of TCLP extraction fluid from the thus-treated COPR to above 7.

Illustratively according to this aspect of the invention, adding a base comprises adding calcium hydroxide to the treatment vessel.

Illustratively according to the several aspects of the invention, the method is conducted ex situ.

Alternatively illustratively according to the several aspects of the invention, the method is conducted in situ.

BRIEF DESCRIPTION OF THE DRAWINGS

The invention may best be understood by referring to the following detailed description and accompanying drawings which illustrate the invention.

DETAILED DESCRIPTIONS OF ILLUSTRATIVE EMBODIMENTS

Figure 1:
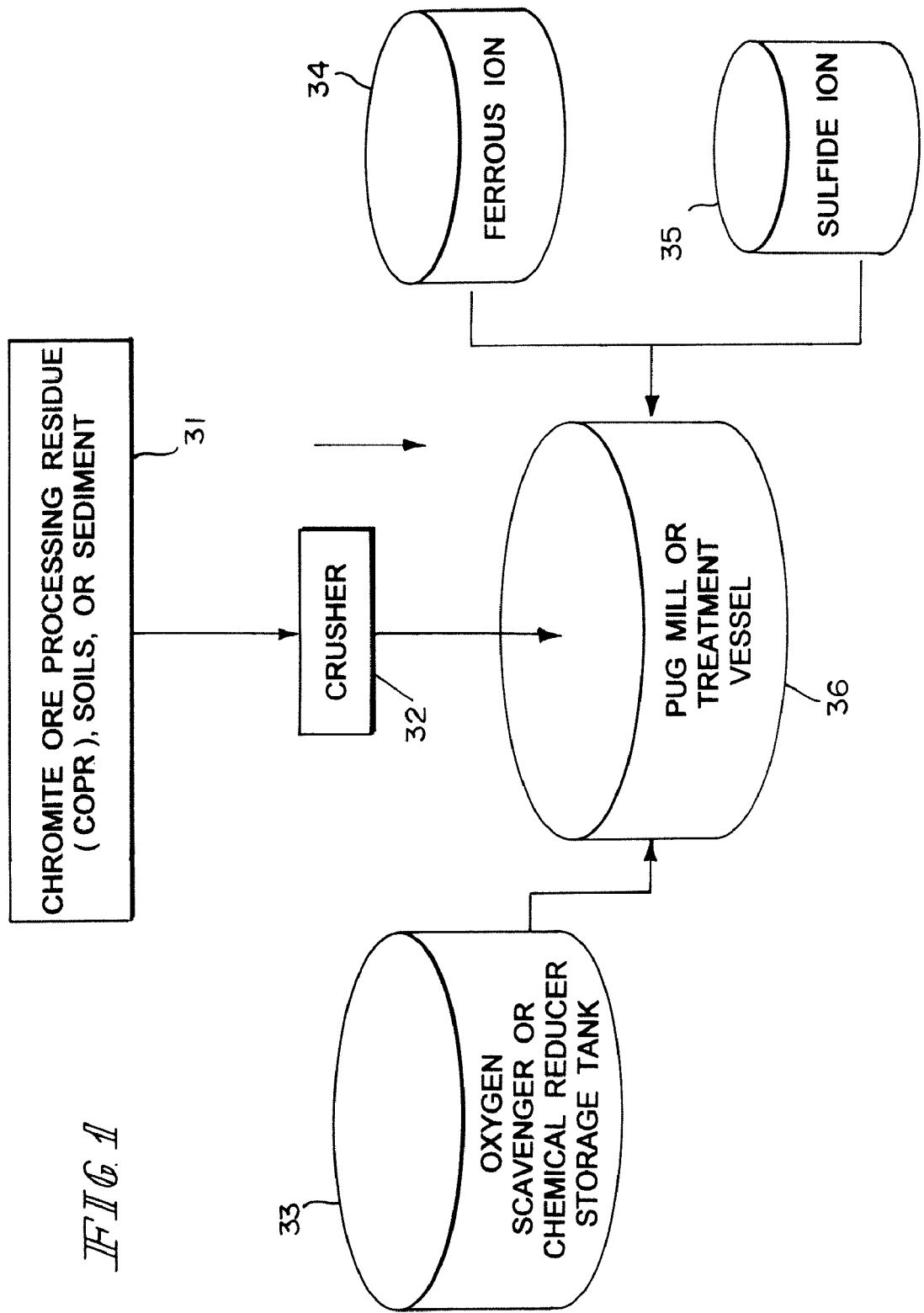
FIG. 1 is a diagrammatic illustration of apparatus for performing methods according to an embodiment of the invention; and, FIG. 2 is a diagrammatic illustration of apparatus for performing methods according to an embodiment of the invention.

A reagent-based treatment process has been shown to stabilize wastes that have high concentrations of COPR with total chromium concentrations in excess of 26,000 mg/kg. The process relies on the use of non-hazardous reagents of which adequate supplies exist to conduct large-scale treatment without significantly altering the reagent market. The process is suitable for on-site or off-site treatment applications. The reagents can be applied in amounts in the range of about 8% to about 10% by weight to the chromite processing wastes using pug mills, paddle mixers, rotary drum mixers, or other readily available mixing equipment that is suitable for physically handling the waste materials.

Generally the methods of the present invention involve contacting chromite processing wastes with an oxygen scavenger or chemical reducer and a source of sulfide ions and/or ferrous ions. As a result, hexavalent chromium (Cr(VI)) in the wastes, which is soluble and exhibits a high toxicity, is reduced to the less toxic and less soluble trivalent state.

The reagents can be combined with the chromite processing wastes in any order. For example, the chromite processing wastes can first be combined with the oxygen scavenger or chemical reducer and thereafter combined with the source of sulfide ions and/or ferrous ions. Alternatively, the chromite processing wastes can first be combined with the source of sulfide ions and/or ferrous ions and thereafter combined with the oxygen scavenger or chemical reducer. Otherwise the chromite processing wastes can be combined with the oxygen scavenger or chemical reducer and with the source of sulfide ions and/or ferrous ions at the same time.

As discussed below, it is also within the scope of the present invention to combine the chromite processing wastes with reactants that produce, generate or supply either or both the oxygen scavenger or chemical reducer and with the source of sulfide ions and/or ferrous ions.

The oxygen scavenger or chemical reducer can comprise sodium sulfite and/or sodium bi-sulfite.

The sulfide ions can be from any suitable source such as polysulfides, including calcium polysulfide or sodium hydrosulfide. The ferrous ions likewise may be from any suitable source such as ferrous sulfate heptahydrate or ferrous chloride.

A suitable source for both sulfide ions and ferrous ions is ferrous sulfide which can be provided by combining at least one of ferrous sulfate heptahydrate and ferrous chloride with at least one of sodium hydrosulfide and calcium polysulfide.

As discussed above, the chromite processing wastes can be combined with the reagents using pug mills, paddle mixers, rotary drum mixers or other readily available mixing equipment that is suitable for physically handing the waste materials. For on-site treatment the reagents can be mixed into the chromite processing wastes using tiling apparatuses or other apparatuses that are suitable for the physical condition of the wastes.

In order to ensure that the reagents fully contact the chromite processing wastes, the wastes can be subject to an initial pretreatment step of crushing, grinding, milling, screening, etc. Otherwise the mixing apparatus that combines the chromite processing wastes with the reagents can reduce the size of waste particles or clumps. Sediment wastes that are wet can be treated in treatment vessels that are provided with suitable mixing apparatus.

According to the present invention the method of processing or treating chromite processing wastes can include the step of determining the pH of the chromite processing wastes as the treatment proceeds. Such pH determination can be achieved, for example, by testing or monitoring the pH of fluid extracted from the treatment vessel in which the chromite processing wastes and reagents are combined. If the pH is below 7 a base can be added to the wastes to increase the pH to above 7. A suitable base that can be added to control pH is calcium hydroxide.

As indicated above the methods of treating or processing chromite processing wastes can be ex situ or in situ.

Referring to FIG. 1, an ex situ method to reduce hexavalent chromium in COPR, soils or sediments includes contacting the COPR with an oxygen scavenger or chemical reducer and a source of ferrous sulfide to effect the chemical reduction of Cr(VI) to a less toxic and less mobile valence state.

According to the method, chromite processing wastes, such as COPR, soils or sediments 31 are placed into an apparatus 32 that crushes, grinds, mills, screens or otherwise reduces the size of clumps or particles of the wastes to effect contact thereof with reagents during the reagent treatment. After any necessary or desirable size reduction, or if such reduction is not required, the COPR, soils or sediment 31 are placed directly into the treatment vessel 36. When treating chromite processing wastes, the treatment vessel 36 can be a pug mill, paddle mixer, rotary drum mixer or other readily available mixing apparatus that is suitable for physically handing the waste material. When the chromite processing wastes are wet sediments, the treatment vessel 36 can be any conventional treatment vessel that is provided with a suitable mixing apparatus.

An oxygen scavenger or chemical reducer 33 such as sodium sulfite or sodium bi-sulfite solution, is added to the treatment vessel 36 containing the chromite processing wastes 31 and mixed therewith so that the oxygen scavenger or chemical reducer 33 thoroughly contacts the wastes.

After allowance for adequate reaction time between the oxygen scavenger or chemical reducer 33 in the treatment vessel 36 containing the chromite processing wastes 31, ferrous ions from a source 34 and/or sulfide ions from a source 35 is/are then blended into the treatment vessel 36 to reduce the Cr+6 to Cr+3.

According to one embodiment, sulfide ions and ferrous ions can be supplied from a single source of ferrous sulfide. The ferrous sulfide is produced by combination of a ferrous ion source 34 such as a source of ferrous sulfate heptahydrate or ferrous chloride, and a sulfide ion source 35 such as a source of calcium polysulfide or sodium hydrosulfide.

Referring to FIG. 2, an ex situ method to reduce hexavalent chromium in chromite processing wastes includes contacting the chromite processing wastes with an oxygen scavenger or chemical reducer and a source of ferrous sulfide to effect the chemical reduction of Cr(VI) to a less toxic and less mobile valence state. According to the method, the chromite processing wastes 41 are placed into an apparatus 42 that crushes, grinds, mills, screens or otherwise reduces the size of clumps or particles of the wastes to effect contact thereof with reagents during the reagent treatment. After any necessary or desirable size reduction, the chromite processing wastes 41 are placed directly into a treatment vessel 46, which may be a pug mill, paddle mixer, rotary drum mixer or other readily available mixing apparatus that is suitable for physically handling the chromite processing wastes 41. Again, when the chromite processing wastes 41 are wet sediments, the treatment vessel 46 can be any conventional treatment vessel that is provided with suitable mixing apparatus. If the chromite processing wastes 41 do not require size reduction, the chromite processing wastes can be fed directly from source 41 into treatment vessel 46. An oxygen scavenger or chemical reducer 43 such as sodium sulfite or sodium bi-sulfite solution, is added to treatment vessel 46 containing the chromite processing wastes 41 and mixed therewith so that the oxygen scavenger or chemical reducer 43 thoroughly contacts the chromite processing wastes. After allowance for adequate reaction time between the oxygen scavenger or chemical reducer 43 in the treatment vessel 46 containing the chromite processing wastes 41, a source of ferrous sulfide is then blended into the pug mill or treatment vessel 46 to reduce the Cr+6 to Cr+3. The ferrous sulfide is produced by combination of a ferrous ion source 44 such as a source of ferrous sulfate heptahydrate or ferrous chloride, and a sulfide ion source 45 such as a source of calcium polysulfide or sodium hydrosulfide. If after allowance for adequate reaction time between the chromite processing wastes 41, the oxygen scavenger or chemical reducer 43 and ferrous sulfide in the treatment vessel 46 the pH of TCLP extraction fluid from the treatment is below 7, a source of alkalinity 47, such as a source of calcium hydroxide, is blended into the pug mill or treatment vessel 46 to increase the pH of TCLP extraction fluid from the treated chromite processing wastes to above 7.

Continuing to refer to FIG. 2, according to another aspect of the invention, an ex situ method to reduce hexavalent chromium in chromite processing wastes includes contacting the chromite processing wastes with an oxygen scavenger or chemical reducer and a source of a sulfide ion and a source of a ferrous ion to effect the chemical reduction of Cr(VI) to a less toxic and less mobile valence state. According to the method, the chromite processing wastes 41 are placed into a crusher, grinder or similar type device 42, or if crushing is not required, the chromite processing wastes 41 are placed directly into the treatment vessel 46. An oxygen scavenger or chemical reducer 43 such as sodium sulfite or sodium bi-sulfite solution, is added to the treatment vessel 46 containing the chromite processing wastes 41 and mixed. After allowance for adequate reaction time between the oxygen scavenger or chemical reducer 43 in the treatment vessel 46 containing the chromite processing wastes 41, a sulfide ion source 45 such as a source of calcium polysulfide or sodium hydrosulfide and a ferrous ion source 44 such as a source of ferrous sulfate heptahydrate or ferrous chloride are then blended into the treatment vessel 46 to reduce the Cr+6 to Cr+3. If after allowance for adequate reaction time between the chromite processing wastes 41, the oxygen scavenger or chemical reducer 43, the ferrous ion source 44, and the sulfide ion source 45 in the treatment vessel 46 the pH of TCLP extraction fluid from the treatment is below 7, a source of alkalinity 47, such as a source of calcium hydroxide, is blended into the treatment vessel 46 to increase the pH of TCLP extraction fluid from the treated chromite processing wastes to above 7.

Continuing to refer to FIG. 2, according to another aspect of the invention, an ex situ method to reduce hexavalent chromium in chromite processing wastes includes contacting the chromite processing wastes with a source of ferrous sulfide produced by combining sulfide ion with ferrous ion to effect the chemical reduction of Cr(VI) to a less toxic and less mobile valence state. According to the method, the chromite processing wastes 41 are placed into a crusher, grinder or similar type device 42, or if crushing is not required, the chromite processing wastes 41 are placed directly into the treatment vessel 46. A sulfide ion source 45 such as a source of calcium polysulfide or sodium hydrosulfide, and a ferrous ion source 44 such as a source of ferrous sulfate heptahydrate or ferrous chloride, are then blended into the treatment vessel 46 to reduce the Cr+6 to Cr+3. If after allowance for adequate reaction time between the chromite processing wastes 41, the ferrous ion source 44 and the sulfide ion source 45 in the treatment vessel 46 the pH of TCLP extraction fluid from the treatment is below 7, a source of alkalinity 47, such as a source of calcium hydroxide, is blended into the treatment vessel 46 to increase the pH of TCLP extraction fluid from the treated chromite processing wastes to above 7.

Continuing to refer to FIG. 2, according to another aspect of the invention, an ex situ method to reduce hexavalent chromium in chromite processing wastes includes contacting the chromite processing wastes with an oxygen scavenger or chemical reducer and a source of a sulfide ion to effect the chemical reduction of Cr(VI) to a less toxic and less mobile valence state. According to the method, the chromite processing wastes 41 are placed into a crusher, grinder or similar type device 42, or if crushing is not required, the chromite processing wastes 41 are placed directly into the treatment vessel 46. An oxygen scavenger or chemical reducer 43 such as sodium sulfite or sodium bi-sulfite solution, is added to the treatment vessel 46 containing the chromite processing wastes 41 and mixed. After allowance for adequate reaction time between the oxygen scavenger or chemical reducer 43 in the treatment vessel 46 containing the chromite processing wastes 41, a sulfide ion source 45 such as a source of calcium polysulfide or sodium hydrosulfide is then blended into the treatment vessel 46 to reduce the Cr+6 to Cr+3. If after allowance for adequate reaction time between the chromite processing wastes 41, the oxygen scavenger or chemical reducer 43 and the sulfide ion source 45 in the treatment vessel 46 the pH of TCLP extraction fluid from the treatment is below 7, a source of alkalinity 47, such as a source of calcium hydroxide, is blended into the treatment vessel 46 to increase the pH of TCLP extraction fluid from the treated chromite processing wastes to above 7.

Continuing to refer to FIG. 2, according to another aspect of the invention, an ex situ method to reduce hexavalent chromium in chromite processing wastes includes contacting the chromite processing wastes with an oxygen scavenger or chemical reducer and a source of ferrous ion to effect the chemical reduction of Cr(VI) to a less toxic and less mobile valence state. According to the method, the chromite processing wastes 41 are placed into a crusher, grinder or similar type device 42, or if crushing is not required, the chromite processing wastes 41 are placed directly into the treatment vessel 46. An oxygen scavenger or chemical reducer 43 such as sodium sulfite or sodium bi-sulfite solution, is added to the treatment vessel 46 containing the chromite processing wastes 41 and mixed. After allowance for adequate reaction time between the oxygen scavenger or chemical reducer 43 in the treatment vessel 46 containing the chromite processing wastes 41, a ferrous ion source 44 such as a source of ferrous sulfate heptahydrate is then blended into the treatment vessel 46 to reduce the Cr+6 to Cr+3. If after allowance for adequate reaction time between the chromite processing wastes 41, the oxygen scavenger or chemical reducer 43 and the ferrous ion source 44 in the treatment vessel 46 the pH of TCLP extraction fluid from the treatment is below 7, a source of alkalinity 47, such as a source of calcium hydroxide, is blended into the treatment vessel 46 to increase the pH of TCLP extraction fluid from the treated chromite processing wastes to above 7.

Continuing to refer to FIG. 2, according to another aspect of the invention, an ex situ method to reduce hexavalent chromium in chromite processing wastes includes contacting the chromite processing wastes with a source of a sulfide ion and a source of a ferrous ion to effect the chemical reduction of Cr(VI) to a less toxic and less mobile valence state. According to the method, the chromite processing wastes 41 are placed into a crusher, grinder or similar type device 42, or if crushing is not required, the chromite processing wastes 41 are placed directly into the treatment vessel 46. A ferrous ion source 44 such as a source of ferrous sulfate heptahydrate or ferrous chloride, and a sulfide ion source 45 such as a source of calcium polysulfide or sodium hydrosulfide are then blended into the treatment vessel 46 to reduce the Cr+6 to Cr+3. If after allowance for adequate reaction time between the chromite processing wastes 41, the ferrous ion source 44, and the sulfide ion source 45 in the treatment vessel 46 the pH of TCLP extraction fluid from the treatment is below 7, a source of alkalinity 47, such as a source of calcium hydroxide, is blended into the treatment vessel 46 to increase the pH of TCLP extraction fluid from the treated chromite processing wastes to above 7.

Continuing to refer to FIG. 2, according to another aspect of the invention, an ex situ method to reduce hexavalent chromium in chromite processing wastes includes contacting the COPR with a source of sulfide ions to effect the chemical reduction of Cr(VI) to a less toxic and less mobile valence state. According to the method, the chromite processing wastes 41 are placed into a crusher, grinder or similar type device 42, or if crushing is not required, the chromite processing wastes 41 are placed directly into the treatment vessel 46. A sulfide ion source 45 such as calcium polysulfide or sodium hydrosulfide is then blended into the treatment vessel 46 to reduce the Cr+6 to Cr+3. If after allowance for adequate reaction time between the chromite processing wastes 41 and the sulfide ion source 45 in the treatment vessel 46 the pH of TCLP extraction fluid from the treatment is below 7, a source of alkalinity 47, such as a source of calcium hydroxide, is blended into the treatment vessel 46 to increase the pH of TCLP extraction fluid from the treated chromite processing wastes to above 7.

Treatability Study

Treatability testing on actual COPR samples has demonstrated under TCLP testing that chromium leaching drops below the UTS of 0.6 mg/kg within hours of treatment with the process. Most importantly, treated samples produced even lower TCLP chromium results weeks following treatment. This is contrary to the results observed for many other treatment regimes currently in use. A recent site-specific treatability study revealed the following TCLP chromium results.

Treatability Testing Results Using the Described Process

| Sample I.D. | TCLP Cr Concentration Prior to Treatment | Total Cr Concentration | Cure Time (Days Post Treatment) | Post treatment TCLP Cr Concentration |
|---|---|---|---|---|
| COPR-1A | 82 mg/kg | 22,000 mg/kg | 0 | 0.10 mg/l |
| COPR-2A | 82 mg/kg | 22,000 mg/kg | 4 | 0.09 mg/l |
| COPR-3A | 82 mg/kg | 22,000 mg/kg | 17 | 0.01 mg/l |
| COPR-4A | 82 mg/kg | 22,000 mg/kg | 24 | 0.033 mg/l |
| COPR-5A | 82 mg/kg | 22,000 mg/kg | 31 | 0.006 mg/l |
| COPR-6A | 82 mg/kg | 22,000 mg/kg | 50 | 0.004 mg/l |

What is claimed is:

1. A method to reduce hexavalent chromium (Cr(VI)) in chromite ore processing residue including combining at least one of ferrous sulfate heptahydrate and ferrous chloride with at least one of sodium hydrosulfide and calcium polysulfide to produce ferrous sulfide, and contacting the chromite ore processing residue with the ferrous sulfide to reduce Cr(VI) in the chromite ore processing residue.

2. The method of claim 1 further including contacting the chromite ore processing residue with an oxygen scavenger or chemical reducer, permitting the chromite ore processing residue to react with the oxygen scavenger or chemical reducer and then contacting the chromite ore processing residue with ferrous sulfide to reduce Cr(VI) in the chromite ore processing residue.

3. The method of claim 2 including crushing or grinding the chromite ore processing residue before contacting the chromite ore processing residue with an oxygen scavenger or chemical reducer.

4. The method of claim 2 wherein contacting the chromite ore processing residue with an oxygen scavenger or chemical reducer includes contacting the chromite ore processing residue with one of sodium sulfite and sodium bi-sulfite.

5. The method of claim 2 wherein contacting the chromite ore processing residue with an oxygen scavenger or chemical reducer includes adding the oxygen scavenger or chemical reducer to a treatment vessel containing the chromite ore processing residue and mixing the oxygen scavenger or chemical reducer with the chromite ore processing residue in the treatment vessel.

6. The method of claim 1 conducted ex situ.

7. The method of claim 1 conducted in situ.

8. The method of claim 1 further including determining the pH of toxic characteristic leaching procedures (TCLP) extraction fluid from the thus-treated chromite ore processing residue, and, if the pH is below 7, adding a base to the thus-treated chromite ore processing residue to increase the pH of TCLP extraction fluid from the thus-treated chromite ore processing residue to above 7.

9. The method of claim 8 wherein adding a base comprises adding calcium hydroxide to the treatment vessel.

* * * * *